(12) United States Patent
Fukumoto

(10) Patent No.: US 7,212,417 B2
(45) Date of Patent: May 1, 2007

(54) DUAL-MODE SWITCHING DC-TO-DC CONVERTER

(75) Inventor: Yukinari Fukumoto, Niiza (JP)

(73) Assignee: Sanken Electric Co., Ltd. (JP)

( * ) Notice: Subject to any disclaimer, the term of this patent is extended or adjusted under 35 U.S.C. 154(b) by 0 days.

(21) Appl. No.: 11/427,505

(22) Filed: Jun. 29, 2006

(65) Prior Publication Data

US 2006/0239040 A1    Oct. 26, 2006

Related U.S. Application Data

(63) Continuation of application No. PCT/JP2004/019554, filed on Dec. 27, 2004.

(30) Foreign Application Priority Data

Jan. 14, 2004    (JP)    ............... 2004-007253

(51) Int. Cl.
*H02M 3/335*    (2006.01)
*H02H 7/10*    (2006.01)

(52) U.S. Cl. ............... 363/21.15; 363/21.01; 363/21.07

(58) Field of Classification Search ............... 363/20, 363/21.01, 21.07, 21.08, 21.12, 21.15, 21.16, 363/95, 97, 131
See application file for complete search history.

(56) References Cited

U.S. PATENT DOCUMENTS

| | | | | |
|---|---|---|---|---|
| 5,661,642 A | * | 8/1997 | Shimashita | ............... 363/21.15 |
| 5,862,044 A | * | 1/1999 | Shioya et al. | ............ 363/21.07 |
| 6,445,598 B1 | * | 9/2002 | Yamada | ................... 363/21.12 |
| 6,529,391 B2 | * | 3/2003 | Yoshinaga et al. | ........ 363/21.15 |
| 6,735,095 B2 | * | 5/2004 | Fahlenkamp et al. | ..... 363/21.15 |
| 6,909,616 B2 | * | 6/2005 | Kim | ............................ 363/16 |
| 6,972,970 B2 | * | 12/2005 | Yamada | ................... 363/21.16 |

FOREIGN PATENT DOCUMENTS

| | | |
|---|---|---|
| JP | 2001-145344 | 5/2001 |
| JP | 2003-033018 | 1/2003 |
| JP | 2003-304682 | 10/2003 |
| JP | 2003-338552 | 11/2003 |

\* cited by examiner

*Primary Examiner*—Matthew V. Nguyen
(74) *Attorney, Agent, or Firm*—Woodcock Washburn LLP

(57) ABSTRACT

A transformer has a primary winding connected to a pair of DC input terminals via an active switch, and a secondary winding connected to a pair of DC output terminals via a first rectifying and smoothing circuit. The active switch is driven constantly under normal load, and at intervals under light load, under the direction of a switch control circuit. This switch control circuit is powered with a control voltage fed from a second rectifying and smoothing circuit which is connected to a tertiary winding of the transformer. In order to preclude malfunctioning or nonoperation in the event of an abnormal drop of the control voltage during operation in light load mode, the switch control circuit is equipped to drive the active switch at shorter intervals in control voltage recovery mode when the control voltage falls below a predefined limit than the normal intervals of the light load mode.

6 Claims, 8 Drawing Sheets

DUAL-MODE SWITCHING DC-TO-DC CONVERTER

CROSS-REFERENCE TO RELATED APPLICATIONS

This is a continuation of Application PCT/JP2004/019554, filed Dec. 27, 2004, which claims priority to Japanese Patent Application No.2004-007253 filed Jan. 14, 2004.

BACKGROUND OF THE INVENTION

This invention relates to switching-mode DC-to-DC converters, and more particularly to those of the dual-mode variety capable of driving, or rapidly turning on and off, the active switch constantly under normal load and at temporarily enforced intervals under light load.

A typical conventional switching-mode DC-to-DC converter includes a transformer having a primary winding coupled to the pair of DC input terminals via an active switch, and a secondary winding coupled to the pair of DC output terminals via a rectifying and smoothing circuit. The active switch is driven by a switch control circuit which is powered from a tertiary winding of the transformer via another rectifying and smoothing circuit.

It has been suggested in conjunction with the DC-to-DC converter of the kind outlined above to drive the active switch at intervals when the power requirement of the load is low, in order to reduce switching loss and hence to enhance the efficiency of the converter. The intermittent driving of the active switch in light load mode makes the switchings drastically less in number on an average per unit length of time than when the switch is driven continuously in normal load mode. The diminution of average switchings in light load mode leads to the curtailment of switching loss and consequently to a higher overall efficiency of the converter.

Such dual-mode driving of the voltage regulator switch has had a weakness left undefeated, however. The voltage across the smoothing capacitor of the first recited rectifying and smoothing circuit, on the output side of the transformer, rises when the active switch is being driven, and diminishes when it is not. The same applies to the supply voltage (herein termed the control voltage) fed from the second rectifying and smoothing circuit coupled to the transformer tertiary to the switch control circuit for powering the latter.

A problem arose because of a difference in the rate of voltage diminution between the capacitor of the first rectifying and smoothing circuit and that of the second rectifying and smoothing circuit when the power requirement of the load was extremely low. The power requirement of the switch control circuit is hardly affected by changes in the power requirement of the load, so that the capacitor voltage of the second rectifying and smoothing circuit declines far more greatly than that of the first rectifying and smoothing circuit while the active switch is not being driven during operation in light load mode. Actually, the switch control circuit went out of operation, becoming totally incapable of driving the active switch, in the worst case where the control voltage being supplied to the switch control circuit fell below the allowable minimum.

Once set out of operation, the switch control circuit must return to normal functioning after a mandatory restart period of several hundreds milliseconds. The smoothing capacitor was left uncharged during this restart period, so that its voltage dwindled further, making it impossible or difficult to feed the load as required.

It might be contemplated for the mitigation of the foregoing difficulty to provide a transformer tertiary of a greater number of turns, and a smoothing capacitor of greater capacitance, than heretofore. Such a transformer would introduce a greater power loss, running counter to the prime objective of overall converter efficiency enhancement. Another possible measure might be to drive the active switch at shorter intervals throughout the light load mode. This remedy is objectionable because it would make the average number of switchings greater per unit length of time, again to the impairment of the noted prime objective.

A more drastic approach is suggested by Japanese Unexamined Patent Publication No. 2003-33018, which calls for invalidation of the light load mode altogether in the event of an excessive drop in the control voltage supplied to the switch control circuit. The active switch is driven continuously even when it should be at intervals, thereby giving rise to as much switching loss under light load as under normal load.

SUMMARY OF THE INVENTION

The present invention seeks, in a dual-mode DC-to-DC converter of the kind defined, to assure stable operation of the converter in the face of a drop in the control voltage being fed to the switch control circuit in light load mode, while at the same time a resulting increase in switching loss is kept at a minimum.

Briefly, the invention may be summarized as a dual-mode switching DC-to-DC converter capable of operation in either normal load mode or light load mode depending upon the power requirement of the load. Included are an active switch connected to DC input means via a transformer, a switch control circuit for controllably driving the active switch, a first rectifying and smoothing circuit connected between the transformer and DC output means for providing a DC output voltage to be applied to a load, and a second rectifying and smoothing circuit connected between the transformer and the switch control circuit for supplying a control voltage to the latter.

Of the above listed components of the DC-to-DC converter, characterizing the invention is the switch control circuit which comprises: (a) feedback circuit means for providing a feedback signal indicative of the DC output voltage; (b) a control voltage monitoring circuit connected to the second rectifying and smoothing circuit for providing an output signal indicative of whether the control voltage is less than a predefined limit or not; (c) a switch control pulse generator circuit connected between the feedback circuit means and the active switch for generating switch control pulses thereby to drive the active switch so as to keep the DC output voltage constant; (d) a multiple reference voltage generator circuit connected to the control voltage monitoring circuit for providing a multiple-value reference voltage that has either of first two different predefined values when the control voltage is not less than the predefined limit and that has either of second two different predefined values when the control voltage is less than the predefined limit, the second two different predefined values being intermediate the first two different predefined values; and (e) a mode select comparator having a first input connected to the feedback circuit means, a second input connected to the multiple reference voltage generator circuit, and an output connected to the switch control pulse generator circuit. The mode select comparator operates hysteretically in response to the multiple-value reference signal in order to cause the switch control pulse generator circuit to drive the active switch at first predetermined intervals when the power requirement of the load is relatively low and, at the same time, when the control voltage is not less than the predefined limit, and at second predetermined intervals, shorter than the first predetermined intervals, when the power requirement of the load is relatively low and, at the same time, when the control voltage is less than the predefined limit.

Thus, when the DC-to-DC converter is triggered into light load mode, with the control voltage initially higher than the predefined limit for powering the switch control circuit, the multiple reference voltage generator circuit provides the reference voltage that has the first two different predefined values. Operating hysteretically in response to these first two different reference voltage values, the mode select comparator causes the switch control pulse generator circuit to drive the active switch at relatively long intervals in light load mode.

The control voltage may diminish below its allowable minimum during this light load mode operation, as has been explained in connection with the prior art. Thereupon the multiple reference voltage generator circuit provides the reference voltage that has the second two different predefined values. Both being intermediate the first two different reference voltage values, the second two different reference voltage values have a difference therebetween that is less than that between the first two. The mode select comparator responds to these second two different reference voltage values by causing the switch control pulse generator circuit to drive the active switch at shorter intervals (in what is herein termed the control voltage recovery mode) than those in light load mode. During subsequent operation in control voltage recovery mode overriding the light load mode, the control voltage will recover to its normal value, or to a value more or less close to it, thereby maintaining the switch control circuit in operation.

It will be appreciated that the active switch is driven intermittently not only when the DC output voltage falls below a prescribed limit but additionally when the control voltage grows less than its allowable minimum. Thus, compared to the prior art where the active switch is driven continuously in the event of an excessive drop in the control voltage, the invention succeeds in reduction of the average number of switchings per unit length of time and so contributes to enhancement of the efficiency of switching-mode power supplies of this kind.

The above and other objects, features and advantages of this invention will become more apparent, and the invention itself will best be understood, from a study of the following description and appended claims, with reference had to the attached drawings showing some preferable embodiments of the invention.

DETAILED DESCRIPTION OF ILLUSTRATIVE EMBODIMENTS

Figure 1:
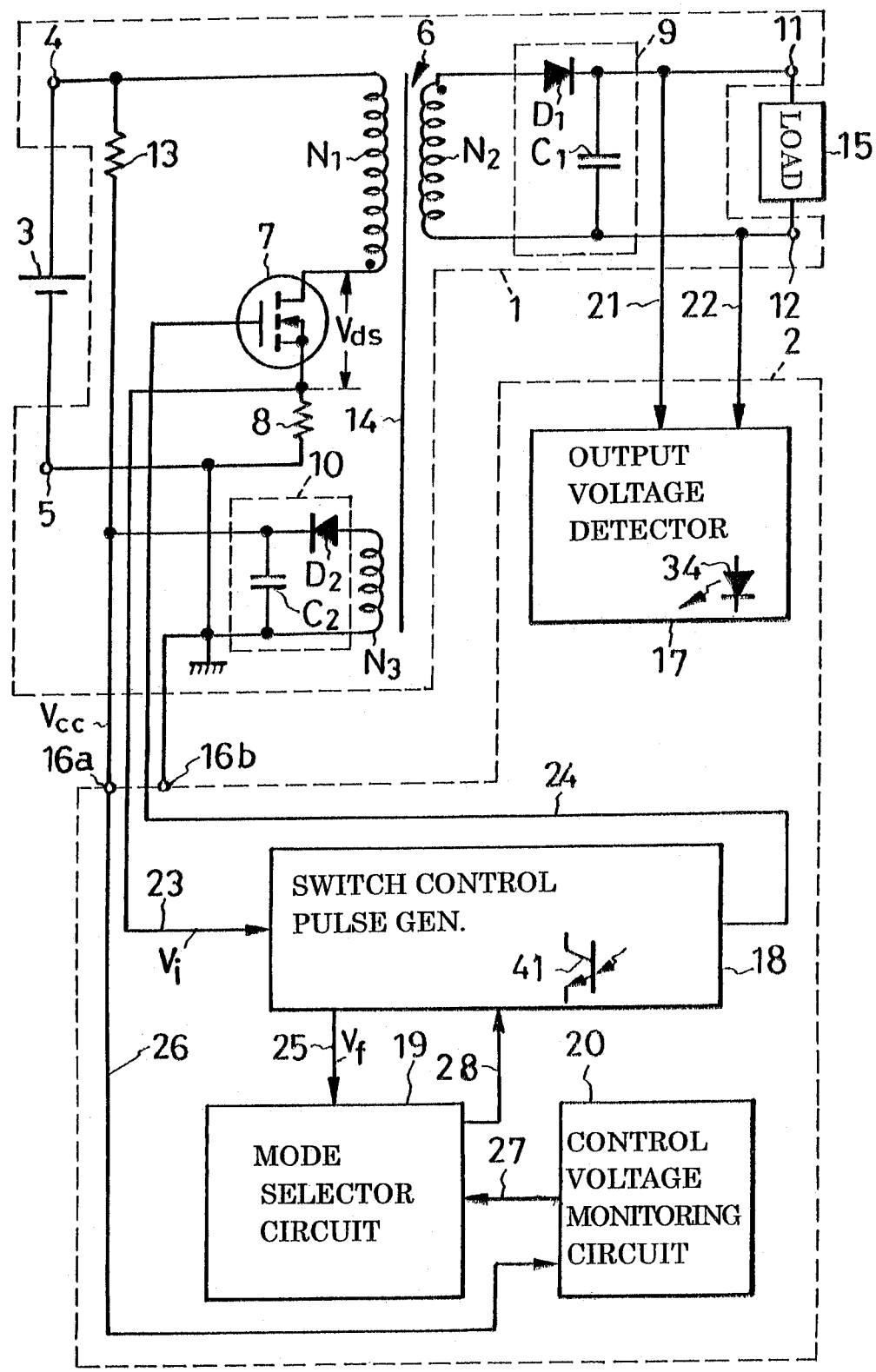
FIG. 1 is a schematic electrical diagram, partly in block form, of the dual-mode switching DC-to-DC converter embodying the principles of this invention.

The present invention is currently believed to be best embodied in the dual-mode, flyback DC-to-DC converter depicted in its entirety in FIG. 1 of the drawings above. The representative DC-to-DC converter is broadly divisible into a DC-to-DC converter circuit 1 and a switch control circuit 2, the latter being shown in more detail in FIG. 2. With reference to FIG. 1 the DC-to-DC converter circuit 1 comprises:

1. A pair of DC input terminals 4 and 5 shown connected to a DC power supply 3.
2. A pair of DC output terminals 11 and 12 shown connected to a load 15.
3. A transformer 6 having a primary winding $N_1$ connected to the pair of DC input terminals 4 and 5, a secondary winding $N_2$ connected to the pair of DC output terminals 11 and 12, and a tertiary winding $N_3$.
4. An active switch 7 connected between the pair of DC input terminals 4 and 5 via the transformer primary $N_1$ for rapidly switching the DC input voltage under the direction of the switch control circuit 2.
5. A first rectifying and smoothing circuit 9 connected to the transformer secondary $N_2$ for providing a DC output voltage.
6. A second rectifying and smoothing circuit 10 connected to the transformer tertiary $N_3$ for providing a DC control voltage $V_{cc}$ which is fed to the switch control circuit 2 for powering the same.

In practice the DC power supply 3 may be either a rectifying and smoothing circuit or a battery. It applies a prescribed DC voltage between the pair of DC input terminals 4 and 5.

The transformer 6 has the noted three windings $N_1$, $N_2$ and $N_3$ all coiled around a magnetic core 14 and all electromagnetically coupled together. The transformer primary $N_1$ has its pair of opposite extremities connected respectively to the pair of DC input terminals 4 and 5. Interposed between the DC input terminal 5, which is grounded, and the transformer primary $N_1$ is the active switch 7 which takes the form of a controllable solid-state switch such as a field-effect transistor. A current detect resistor 8 is connected between the grounded DC input terminal 5 and the active switch 7 for providing a current detect signal $V_i$ in the form of a sawtoothed voltage indicative of the magnitude of the current flowing through the transformer primary $N_1$ and active switch 7.

The transformer secondary $N_2$ is connected to the first rectifying and smoothing circuit 9 and thence to the pair of DC output terminals 11 and 12. The first rectifying and smoothing circuit 9 comprises a diode $D_1$ and a smoothing capacitor $C_1$. The smoothing capacitor $C_1$ is connected in parallel with the transformer secondary $N_2$ via the diode $D_1$ and to the pair of DC output terminals 11 and 12. The load 15 may make variable power requirement which for the purposes of this invention may be described as normal or low depending upon whether it is higher or lower than a predetermined limit.

The second rectifying and smoothing circuit 10 also comprises a diode $D_2$ and a smoothing capacitor $C_2$. The smoothing capacitor $C_2$ is connected in parallel with the transformer tertiary $N_3$ via the diode $D_2$. The smoothing capacitor $C_2$ has one terminal connected both to the DC input terminal 4 via a startup resistor 13 and to the plus supply terminal $16_a$ of the switch control circuit 2. The other terminal of the smoothing capacitor $C_2$ and the ground terminal $16_b$ of the switch control circuit 2 are both connected to the DC input terminal 5.

The switch control circuit 2 possesses the following functions:

1. Monitoring the DC output voltage.
2. Causing the active switch 7 to be driven constantly in normal load mode when the power requirement of the load 15 is higher than the prescribed limit.
3. Causing the active switch 7 to be driven at intervals in light load mode when the power requirement of the load is less than the prescribed limit.
4. Monitoring the output voltage of the second rectifying and smoothing circuit 10.
5. Causing the active switch 7 to be driven at shorter intervals in control voltage recovery mode than those in light load mode when the control voltage being fed from the second rectifying and smoothing circuit 10 to the switch control circuit 2 falls below a predetermined value.

Figure 2:
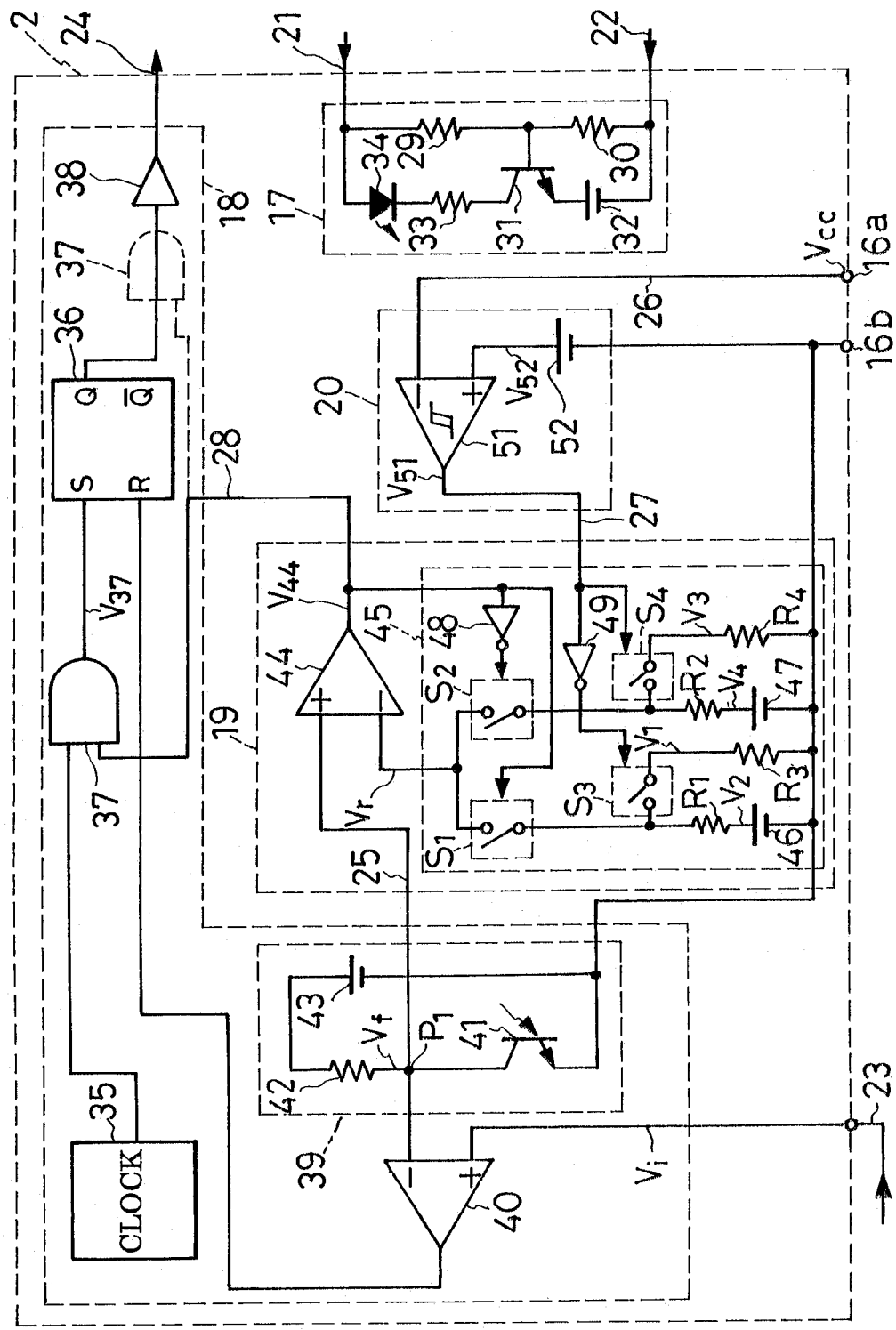
FIG. 2 is a schematic electrical diagram showing in more detail the switch control circuit included in the DC-to-DC converter of FIG. 1.

For performing these functions the switch control circuit 2 comprises the following four circuits shown in block form in FIG. 1 and in detail in FIG. 2:

1. An output voltage detector circuit 17 for providing an optical output indicative of the DC output voltage being applied to the load 15.
2. A switch control pulse generator circuit 18 for providing a series of switch control pulses thereby to drive the active switch 7 in response to the current detect signal $V_i$ and the optical output from the output voltage detector circuit 17.
3. A mode selector circuit 19 responsive to an output voltage feedback signal $V_f$ from the switch control pulse generator circuit 18 for causing the same to drive the active switch 7 either constantly in normal load mode, at intervals in light load mode, or at shorter intervals in control voltage recovery mode.
4. A control voltage monitoring circuit 20 for monitoring the control voltage $V_{cc}$ from the second rectifying and smoothing circuit 10 by comparing the control voltage with a predefined value.

With continued reference to FIG. 1 the output voltage detector circuit 17 is connected to the pair of DC output terminals 11 and 12 by way of conductors 21 and 22. This circuit 17 includes a light-emitting diode (LED) 34 for putting out an optical signal of variable intensity indicative of the magnitude of the DC output voltage.

Electrically isolated from the output voltage detector circuit 17, the switch control pulse generator circuit 18 incorporates a photoreceptor 41 for inputting the optical output therefrom. Additionally, the switch control pulse generator circuit 18 has an input connected to the current detect resistor 8 by way of a conductor 23 and an output connected to the control terminal of the active switch 7. The current detect resistor 8 is shown outside the switch control pulse generator circuit 18 for illustrative convenience only. This resistor 8 might be considered a part of the switch control pulse generator circuit 18.

Having an input connected to the switch control pulse generator circuit 18 by way of a conductor 25, the mode selector circuit 19 determines the power requirement of the load 15 from the output voltage feedback signal $V_f$ which has been reconstructed in the circuit 18 from the optical output from the output voltage detector circuit 17. When the power requirement is found low, the mode selector circuit 19 delivers a mode select signal over a conductor 28 to the switch control pulse generator circuit 18, such that the active switch 7 is thereby driven at intervals.

The control voltage monitoring circuit 20 has an input connected to the plus supply terminal $16_a$ of the switch control circuit 2 by way of a conductor 26 and an output connected to the mode selector circuit 19 by way of a conductor 27. The output from this control voltage monitoring circuit 20 is a binary signal indicative of whether the control voltage $V_{cc}$ is higher than a predetermined limit or not.

Figure 3:
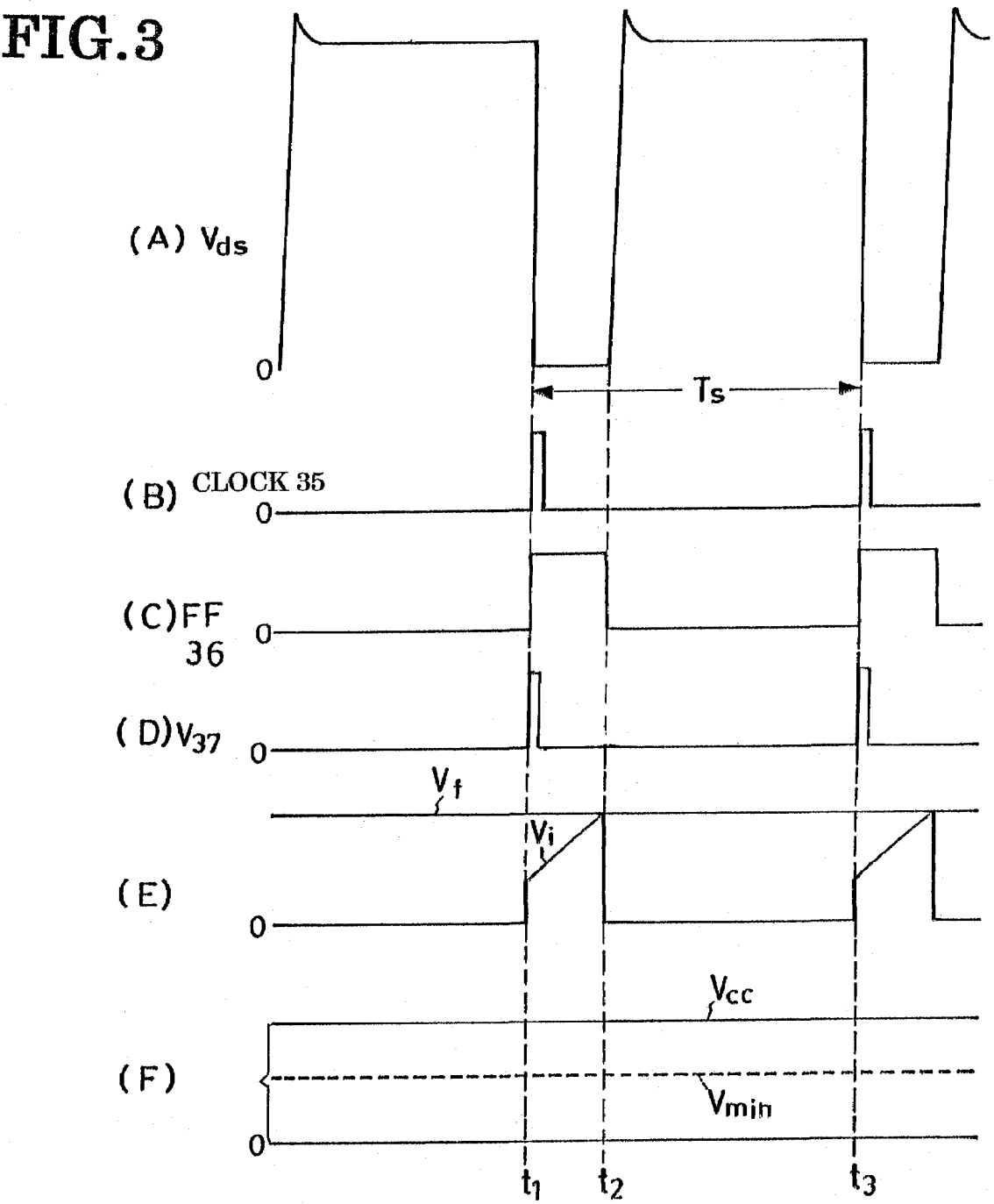
FIG. 3, consisting of (A) through (F), is a diagram of waveforms useful in explaining the operation of the DC-to-DC converter of FIGS. 1 and 2 in normal load mode.
Figure 4:
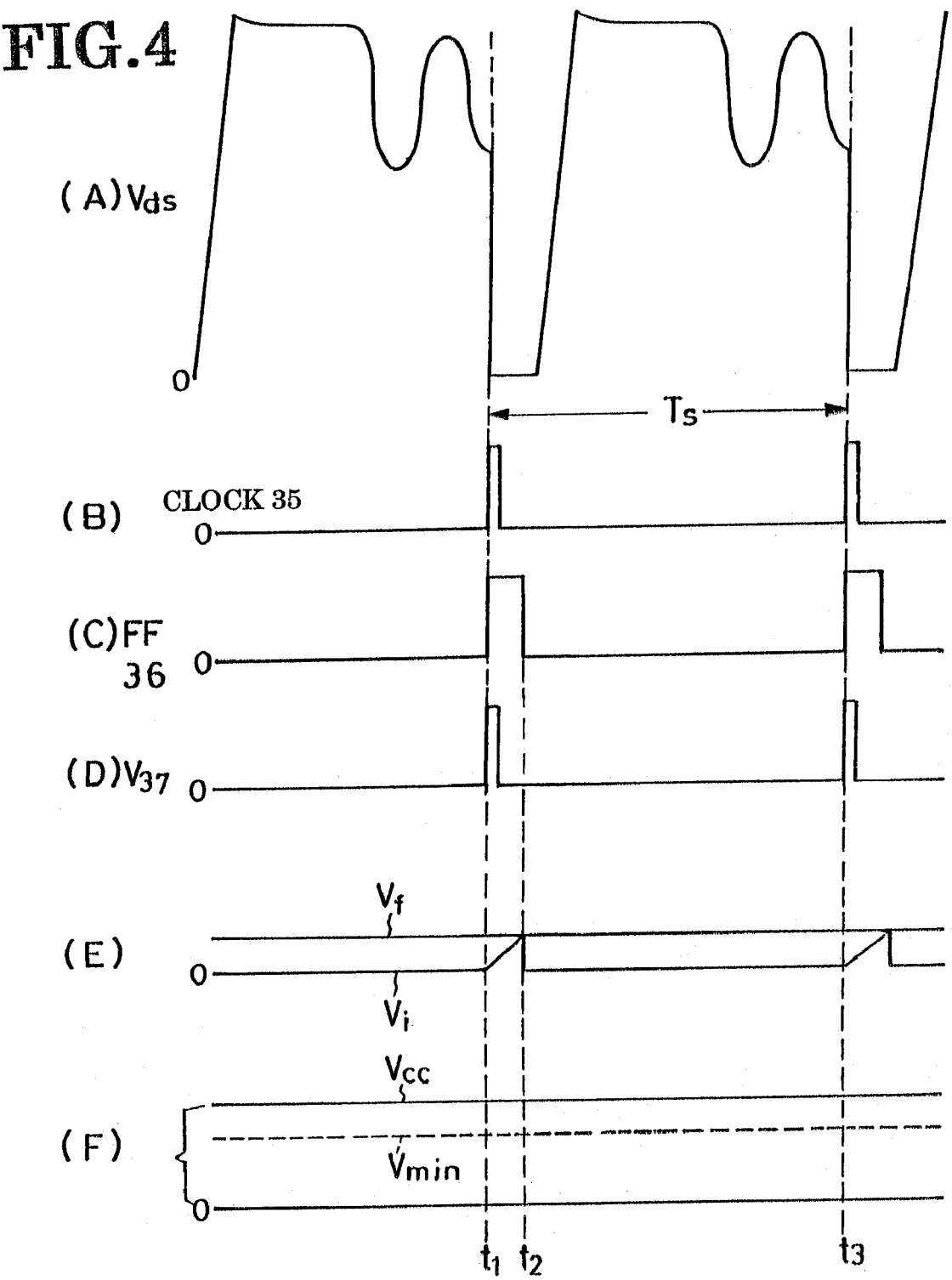
FIG. 4, consisting of (A) through (F), is a waveform diagram similar to FIG. 3 and useful in explaining the operation of the DC-to-DC converter of FIGS. 1 and 2 immediately before being triggered into light load mode.

Reference is now invited to FIG. 2 for a more detailed study of the switch control circuit 2. The waveform diagrams of FIGS. 3–5 will also be referred to in the course of the detailed inspection of FIG. 2. FIG. 3 depicts signals appearing at various parts of the DC-to-DC converter of FIGS. 1 and 2 in normal load mode; FIG. 4 the same signals immediately before the converter is ushered into light load mode; and FIG. 5 the signals appearing at various parts of the converter during operation in normal load mode, light load mode, and control voltage recovery mode according to the invention.

The switch control circuit 2 includes as aforesaid the output voltage detector circuit 17 which comprises two voltage-dividing resistors 29 and 30 interconnected in series between the pair of DC output terminals 11 and 12, FIG. 1., via the conductors 21 and 22. The junction between these resistors 29 and 30 is connected to the base of an npn transistor 31. This transistor 31 has an emitter connected to the conductor 22 via a reference voltage source such as a zener diode 32, and a collector connected to the conductor 21 via a current limiting resistor 33 and a light source such as the aforementioned LED 34. The transistor 31 functions as a differential amplifier, causing the flow through the LED 34 of a current having a magnitude proportional to the difference between the reference voltage from its source 32 and a prescribed fraction of the DC output voltage between the conductors 21 and 22. The LED 34 emits light with an intensity proportional to the DC output voltage between the conductors 21 and 22. This optical output of the output voltage detector circuit 17 is input to the switch control pulse generator circuit 18.

Figure 5:
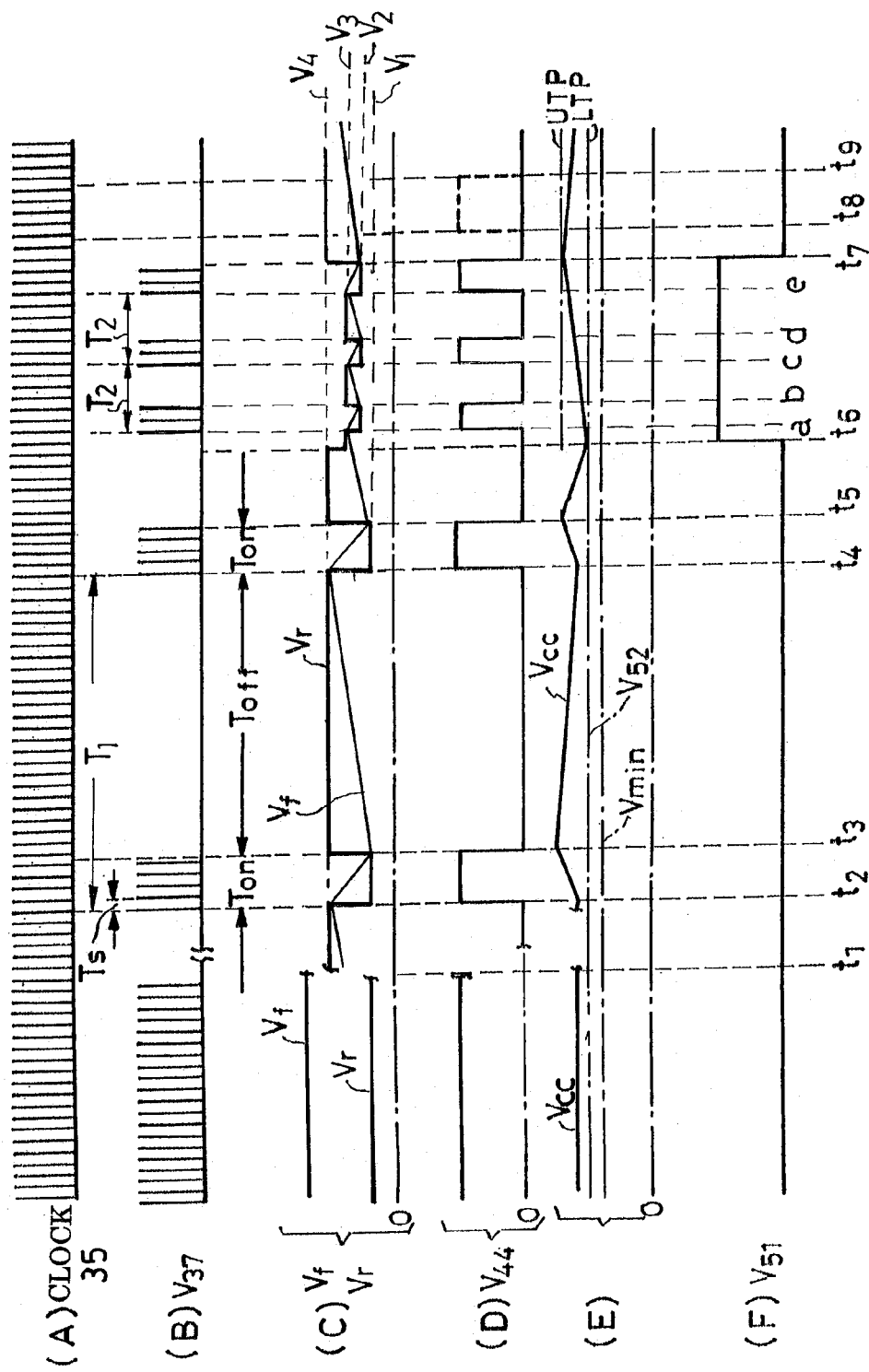
FIG. 5, consisting of (A) through (F), is a diagrams of waveforms appearing at various parts of the switch control circuit of FIG. 2 in normal load mode, light load mode, and control voltage recovery mode.

The switch control pulse generator circuit 18 includes a clock or oscillator 35 which generates a series of accurately timed pulses, seen at (B) in both FIGS. 3 and 4 and at (A) in FIG. 5, with a recurrence rate in the range of 20–100 kilohertz. The clock pulses are directed through an AND gate 37 to the set input S of an RS flip-flop 36. This flop-flop has a reset input R connected to a comparator 40. Consequently, set by each clock pulse 35 and reset by the output from the comparator 40, the flip-flop 36 puts out rectangular pulses of variable duration indicated at (C) in both FIGS. 3 and 4.

For selectively blocking the clock pulses before delivery to the flip-flop 36, the AND gate 37 has another input connected to the mode selector circuit 19 by way of the conductor 28. As seen at (D) in FIG. 5, the mode select signal $V_{44}$ fed from the mode selector circuit 19 over the conductor 28 is such that the AND gate 37 puts out pulses $V_{37}$ either at a fixed rate (normal load. mode), as before $t_1$ in FIG. 5, at relatively long intervals (light load mode) as from $t_1$ to $t_6$ in the same figure, or at shorter intervals (control voltage recovery mode) as from $t_6$ to $t_7$ in the same figure.

The flip-flop 36 has its noninverting output Q connected to a switch driver circuit 38 and thence to the control input of the active switch 7 by way of the conductor 24. It is understood that the switch control pulses from the switch driver circuit 38 are applied between the gate and source of the active switch 7. The electrical connection between the switch driver circuit 38 and the source of the active switch 7 is not shown for simplicity.

The noted output voltage detector circuit 17 is optically coupled to a feedback circuit 39, shown included in the switch control pulse generator circuit 18, for creating a feedback signal $V_f$ in inverse proportion to the DC output voltage. The feedback circuit 39 includes a phototransistor 41 which is to be irradiated by the LED 34 of the output voltage detector circuit 17. The phototransistor 41 has its collector connected to one terminal of a biasing power supply 43 via a resistor 42 and its emitter connected to the other terminal of that power supply. Thus the phototransistor 41 provides the feedback signal $V_f$ in inverse proportion to the voltage between the pair of DC output terminals 11 and 12, FIG. 1.

The junction $P_1$ between the phototransistor 41 and the resistor 42 is connected to the minus input of the comparator 40. The plus input of this comparator 40 is connected by way of the conductor 23 to the junction between the active switch 7, FIG. 1, and the current detect resistor 8 for receiving the current detect signal $V_i$.

At (E) in FIG. 3 are indicated the feedback signal $V_f$ and current detect signal $V_i$ which are both input as above to the comparator 40. The ramps of the current detect signal $V_i$ are synchronized with the conducting periods of the active switch 7. The comparator 40 goes high when each current detect signal ramp reaches the feedback signal $V_f$, thereby resetting the flip-flop 36. It is thus seen that, as depicted at (C) in both FIGS. 3 and 4, the flip-flop 36 is set as at $t_1$ and reset at $t_2$. The flip-flop 36 completes one cycle of operation when it is again set at $t_3$, and thereafter repeats the same cycle.

The output voltage of the DC-to-DC converter rises with a drop in power consumption by the load 15, resulting in a decrease in the voltage feedback signal $V_f$ at the junction $P_1$ of the feedback circuit 39. The feedback signal $V_f$ is shown to be lower in value at (E) in FIG. 4 than at (E) in FIG. 3. Having the sawtoothed or triangular waveform on account of the inductance of the transformer primary $N_1$, the current detect signal $V_i$ will build up to the level of the feedback signal $V_f$ in a shorter period of time when the latter signal has a lower value as at (E) in FIG. 4. The output pulses of the flip-flop 36 will therefore grow less in duration as at (C) in FIG. 4 with a decline in the power requirement of the load 15. As the switch control pulses thus diminish in duty ratio, the DC output voltage will lower to the required level.

Referring once again to FIG. 2, the mode selector circuit 19 is broadly divisible into a comparator 44 and a multiple reference voltage generator circuit 45. This comparator 44 will be hereinafter referred to as the mode select comparator in contradistinction from the comparator 40 of the switch control pulse generator circuit 18, and the latter comparator 40 as the switch control comparator. The mode select comparator 44 has its plus input connected by way of the conductor 25 to the junction $P_1$ of the feedback circuit 39 and its minus input to the multiple reference voltage generator circuit 45. The output of the mode select comparator 44 is connected to the AND gate 37 of the switch control pulse generator circuit 18 for delivery of the mode select signal $V_{44}$ over the conductor 28.

Designed to provide a reference voltage $V_r$ of multiple levels $V_1$, $V_2$, $V_3$ and $V_4$ all seen at (C) in FIG. 5, for hysteretic operation of the mode select comparator 44, the multiple reference voltage generator circuit 45 comprises:

1. A serial circuit of a first switch $S_1$, first resistor $R_1$ and first reference voltage source 46 which is connected between the minus input of the mode select comparator 44 and the ground terminal $16_b$.
2. A serial circuit of a second switch $S_2$, second resistor $R_2$ and second reference voltage source 47 which also is connected between the minus input of the mode select comparator 44 and the ground terminal $16_b$.
3. A serial circuit of a third switch $S_3$ and third resistor $R_3$ which is connected in parallel with the serial circuit of the first resistor $R_1$ and first reference voltage source 46.
4. A serial circuit of a fourth switch $S_4$ and fourth resistor $R_4$ which is connected in parallel with the serial circuit of the second resistor $R_2$ and second reference voltage source 47.

The first switch $S_1$ has its control terminal connected to the output of the mode select comparator 44 thereby to be turned on when the comparator output indicates the driving of the active switch 7. The second switch $S_2$ also has its control terminal connected to the mode select comparator 44, but via an inverter 48, in order to be turned on when the comparator output indicates the non-driving of the active switch 7. The third switch $S_3$ has its control terminal connected to the output conductor 27 of the control voltage monitoring circuit 20 via an inverter 49 in order to be turned on when the output from the control voltage monitoring circuit is low. The fourth switch $S_4$ has its control terminal connected directly to the output conductor 27 of the control voltage monitoring circuit 20 in order to be turned on when the output from the control voltage monitoring circuit is high.

Thus the multiple reference voltage generator circuit 45 delivers the reference voltage $V_r$ having any of the four different $V_1$–$V_4$ to the mode select comparator 44. The first and second reference voltage sources 46 and 47 provide the second and fourth reference voltages $V_2$ and $V_4$, respectively.

Constituting a feature of this invention, the control voltage monitoring circuit 20 comprises a hysteretic comparator (hereinafter referred to as the control voltage comparator) 51 and a reference voltage source 52. The control voltage comparator 51 has its minus input connected to the supply terminal $16_a$ of the switch control circuit 2 and thence to the smoothing capacitor $C_2$, FIG. 1, of the second rectifying and smoothing circuit 10, and its plus input connected to the reference voltage source 52. The output of the control voltage comparator 51 is connected to the multiple reference voltage generator circuit 45 of the mode selector circuit 19 by way of the output conductor 27.

The reference voltage $V_{52}$ from its source 52 has a value that is either equal to the minimum allowable value of the control voltage $V_{cc}$ or between this minimum allowable value and the normal value of the control voltage $V_{cc}$. That is to say that the reference voltage $V_{52}$ has a value higher than the maximum control voltage at which the switch control circuit 2 becomes incapable of operation.

At (E) in FIG. 5 is shown the control voltage $V_{cc}$ to be higher than the reference voltage $V_{52}$, the lower trip point (LTP) of the hysteretic control voltage comparator 51, until t6. The resulting output $V_{51}$ from the control voltage comparator 51 is therefore low until that moment, as at (F) in FIG. 5. The low comparator output closes the third switch $S_3$, and opens the fourth switch $S_4$, of the multiple reference voltage generator circuit 45 of the mode selector circuit 19. Then, at $t_6$ when the control voltage $V_{cc}$ drops to the reference voltage $V_{52}$ as at (E) in FIG. 6, the control voltage comparator 51 goes high as at (F) in FIG. 6 and remains so by virtue of its own hysteresis until $t_7$ when the control voltage $V_{cc}$ builds up to the upper trip point (UTP). This high comparator output holds the third switch $S_3$ of the multiple reference voltage generator circuit 45 off, and its fourth switch $S_4$ on, from $t_6$ to $t_7$.

It is not an absolute necessity that the control voltage comparator 51 be hysteretic. This is because the control voltage comparator 51 stays high as long as the control voltage $V_{cc}$ is less than the reference voltage $V_{52}$. As long as the control voltage comparator 51 is high, the light load mode may be overridden by the control voltage recovery mode, as from $t_6$ to $t_7$ in FIG. 5.

Given herein below is an explanation of how the active switch 7 is driven at intervals in light load mode and at shorter intervals in control voltage recovery mode. The multiple reference voltage generator circuit 45 of the mode selector circuit 19 provides the reference voltage $V_r$ that assumes four different values $V_1$–$V_4$ in light load mode and control voltage recovery mode according to the novel principles of this invention. How the reference voltage $V_r$ acquires each of the four different values $V_1$–$V_4$ may be summarized as follows:

1. First value $V_1$ of the reference voltage $V_r$:

The reference voltage $V_r$ has the first value $V_1$ when the output $V_{44}$ from the mode select comparator 44 is high, as from $t_2$ to $t_3$ and from $t_4$ to $t_5$ in FIG. 5, and at the same time when the output $V_{51}$ from the control voltage comparator 51 is low, as before $t_6$ in FIG. 5. In other words the reference voltage $V_r$ has the first value $V_1$ from the moment (e.g., $t_2$) the feedback signal $V_f$ rises to the fourth reference voltage value $V_4$ to the moment (e.g., $t_3$) the feedback signal $V_f$ dwindles to the first reference voltage value $V_1$, while at the same time the control voltage $V_{cc}$ is higher than the reference voltage $V_{52}$.

2. Second value $V_2$ of the reference voltage $V_r$:

The reference voltage $V_r$ has the second value $V_2$ when the output $V_{44}$ from the mode select comparator and the output $V_{51}$ from the control voltage comparator 51 are both high, as from a to b, from c to d, and from e to $t_7$ at (D) in FIG. 5. In other words the reference voltage $V_r$ has the second value $V_2$ while the feedback signal $V_f$ drops from the third reference voltage value $V_3$ to the second reference voltage value $V_2$ within the period of $t_6$, when the control voltage $V_{cc}$ lowers to the reference voltage $V_{52}$, through $t_7$, when the control voltage rises back to the UTP.

3. Third value $V_3$ of the reference voltage $V_r$:

The reference voltage $V_r$ has the third value $V_3$ when the output $V_{51}$ from the control voltage comparator 51 is high and at the same time when the output $V_{44}$ from the mode select comparator 44 is low. In other words the reference voltage $V_r$ has the third value $V_3$ while the feedback signal $V_f$ builds up from the second reference voltage value $V_2$ to the third reference voltage value $V_3$ within the $t_6$–$t_7$ period when the output $V_{51}$ from the control voltage comparator 51 is high.

4. Fourth value $V_4$ of the reference voltage $V_r$:

The reference voltage $V_r$ has the fourth value $V_4$ when the outputs $V_{44}$ and $V_{51}$ from the mode select comparator 44 and control voltage comparator 51 are both low. In other words the reference voltage $V_r$ has the fourth value $V_4$ from the moment (e.g., $t_3$) the feedback signal $V_f$ diminishes to the first reference voltage value $V_1$ to the moment (e.g., $t_4$) the feedback signal $V_f$ rises back to the fourth reference voltage value $V_4$, while at the same time the control voltage $V_{cc}$ is higher than the reference voltage $V_{52}$.

The foregoing multiple values of the reference voltage $V_r$ affect how the mode select circuit 19 causes the switch control pulse generator circuit 18 to drive the active switch 7. The feedback signal $V_f$ at the junction $P_1$ of the feedback circuit 39 is constantly higher than the fourth reference voltage value $V_4$ as long as the power requirement of the load 15 is normal, as before $t_1$ at (C) in FIG. 5. Therefore, as indicated at (D) in FIG. 5, the mode select comparator 44 remains high, holding the first switch $S_1$ of the multiple reference voltage generator circuit 45 closed. The control voltage comparator 51 is now low, as at (F) in FIG. 5, holding the third switch $S_3$ closed. Thus the reference voltage $V_r$ has the first, and the lowest, value $V_1$, so that the mode select comparator 44 is constantly high as at (D) in FIG. 5.

Inputting this high output from the mode select comparator 33, the AND gate 37 of the switch control pulse generator circuit 18 permits the passage therethrough of the clock pulses, FIG. 5 (A), from the clock 35 on to the flip-flop 36. The clock pulses that have traversed the AND gate 37 are shown at (B) in FIG. 5 and therein labeled $V_{37}$. Set by these clock pulses $V_{37}$ and reset by the output from the switch control comparator 40, the flip-flop 36 delivers the resulting pulses to the switch driver circuit 38, causing the same to deliver the corresponding switch control pulses to the active switch 7 over the conductor 24.

Under light load the feedback voltage $V_f$ will become less than that before $t_1$ as at (C) in FIG. 5. The mode select comparator 44 will go low, closing the second switch $S_2$, when the feedback signal $V_f$ drops to the first reference voltage value $V_1$. The result will be a change of the reference voltage $V_r$ to the fourth value $V_4$, which will hold the mode select comparator 44 low. The low output from the mode select comparator 44 will disable the AND gate 37, preventing the active switch 7 from being driven.

While the active switch 7 is not driven, the control voltage $V_{cc}$ will diminish whereas the feedback signal $V_f$ will rise until it reaches the fourth reference voltage value $V_4$ at $t_2$ as at (C) in FIG. 5. Thereupon the mode select comparator 44 will go high, as at (D) in FIG. 5, thereby closing the first switch $S_1$ and so switching the reference voltage $V_r$ to the first value $V_1$. As a result, the mode select comparator 44 will be hysteretically maintained high from $t_2$ to $t_3$, as will be understood from (C) and (D) in FIG. 5.

The clock pulses from the clock 35 are allowed through the AND gate 37 during this $t_2$–$t_3$ period, as at (B) in FIG. 5. As the active switch 7 is thus driven, the smoothing capacitor $C_1$ and $C_2$, FIG. 1, will both be charged, so that the feedback signal $V_f$ will diminish during this interval, as at (C) in FIG. 5. Finally, when the feedback signal $V_f$ drops to the first reference voltage value $V_1$ at $t_3$, the mode select comparator 44 will go low as at (D) in FIG. 5, again causing the AND gate 37 to block the clock pulses. The driving of the active switch 7 is again suspended at $t_3$.

When the mode select comparator 44 goes low at $t_3$ as above, the first switch $S_1$ of the multiple reference voltage generator circuit 45 will turn off, and the second switch $S_2$ on. The multiple reference voltage generator circuit 45 will then put out the reference voltage of the fourth value $V_4$. The mode select comparator 44 will operate hysteretically, remaining low from $t_3$ to $t_4$, as it compares the feedback voltage $V_f$ with the fourth reference voltage value $V_4$.

With the active switch 7 left undriven during this $t_3$–$t_4$ period, the voltages across the capacitors $C_1$ and $C_2$, FIG. 1, of the rectifying and smoothing circuit 9 and 10 will diminish whereas the feedback signal $V_f$ will build up until it reaches the fourth reference voltage value $V_4$ at $t_4$, as at (C) in FIG. 5. Thereupon the mode select comparator 44 will go high and stay so until $t_5$ as the first switch $S_1$ turns on, and the second switch $S_2$ off, in response to the high output from the mode select comparator. The operation of the mode select comparator 44 during this $t_4$–$t_5$ period is identical with that during the $t_2$–$t_3$ period.

The active switch 7 is driven at shorter intervals in control voltage recovery mode according to the novel concepts of this invention. Automatically overriding the light load mode still in progress, the control voltage recovery mode starts at $t_6$, when the control voltage $V_{cc}$ drops to the LTP of the control voltage comparator 51 as at (E) in FIG. 5, and ends at $t_7$ when the control voltage rises back to the UTP of the control voltage comparator. As will be understood from (B) in FIG. 5, the active switch 7 is driven at relatively long intervals $T_1$ in light load mode, when the control voltage $V_{cc}$ is generally higher, and at shorter intervals $T_2$ in control voltage recovery mode of the $t_6$–$t_7$ period when the control voltage is lower.

The shortening of the drive intervals from the light load mode to the control voltage recovery mode is accomplished by switching the LTP and UTP of the mode select comparator 44 from $V_1$ and $V_4$ to $V_2$ and $V_3$. Being both intermediate the first and fourth reference voltage values $V_1$ and $V_4$, the second and third reference voltage values $V_2$ and $V_3$ have a difference therebetween that is less than that between the values $V_1$ and $V_4$. Thus is the active switch 7 driven at shorter intervals $T_2$ in control voltage recovery mode than those $T_1$ in light load mode.

FIG. 5 indicates at (F) that the control voltage comparator 51 goes high at $t_6$ when the control voltage $V_{cc}$ drops to its LTP as at (E). The mode select comparator 44 on the other hand remains low at $t_6$. The results are the closure of the second and fourth switches $S_2$ and $S_4$ of the multiple reference voltage generator circuit 45, and in consequence the application of the reference voltage $V_r$ of the third value $V_3$ to the mode select comparator 44. Then the mode select comparator 44 will subsequently go high at a when the feedback signal $V_f$ rises to the third reference voltage value $V_3$ as at (C) in FIG. 15. This high output from the mode select comparator 44 will turn the first switch $S_1$ on. The reference voltage $V_r$ of the second value $V_2$ will then be delivered to the mode select comparator 44 thereby causing the same to remain high until b. The clock pulses are therefore free to travel through the AND gate 37 from a to b, causing the active switch 7 to be driven.

The mode select comparator 44 will go low at b when the feedback signal $V_f$ drops to the second reference voltage value $V_2$ as at (C) in FIG. 5. Now the second switch $S_2$ will turn on, and since the fourth switch $S_4$ has been and is still on, the reference voltage $V_r$ of the third value $V_3$ will be applied to the mode select comparator 44. This comparator 44 will then remain low until c as at (D) in FIG. 5. The clock pulses are blocked by the AND gate 37 from b to c, so that the active switch 7 will be left undriven.

One cycle of operation has come to an end at c in control voltage recovery mode. The same cycle will repeat itself thereafter, causing a gradual recovery of the control voltage $V_{cc}$ as at (E) in FIG. 5. At $t_7$, when the control voltage $V_{cc}$ builds up to the UTP of the control voltage comparator 51, this comparator will go low, thereby terminating the control voltage recovery mode and reinitiating the light load mode.

As has been stated during the assessment of the prior art at the beginning of this specification, the active switch was driven continuously throughout the $t_6$–$t_7$ period according to what is believed by this applicant to be the closest prior art. Contrastively, according to the instant invention, the active switch is driven intermittently, though of necessity at shorter intervals, in control voltage recovery mode. There are therefore drastically less switchings, and hence less switching loss, per unit length of time during the $t_6$–$t_7$ period than heretofore.

It will also be appreciated that there occurs no abnormal drop of the control voltage $V_{cc}$ despite the reduction of switchings per unit length of time. Fed with the control voltage, the switch control circuit 2 will stay in operation, stably driving the active switch 7. The switch control circuit 2 will also continue operation in the face of a certain drop in the control voltage $V_{cc}$ due to fluctuations in the DC input voltage. Thus the invention attains the dual objective of higher efficiency and stable operation in dual-mode switching DC-to-DC converters.

Figure 6:
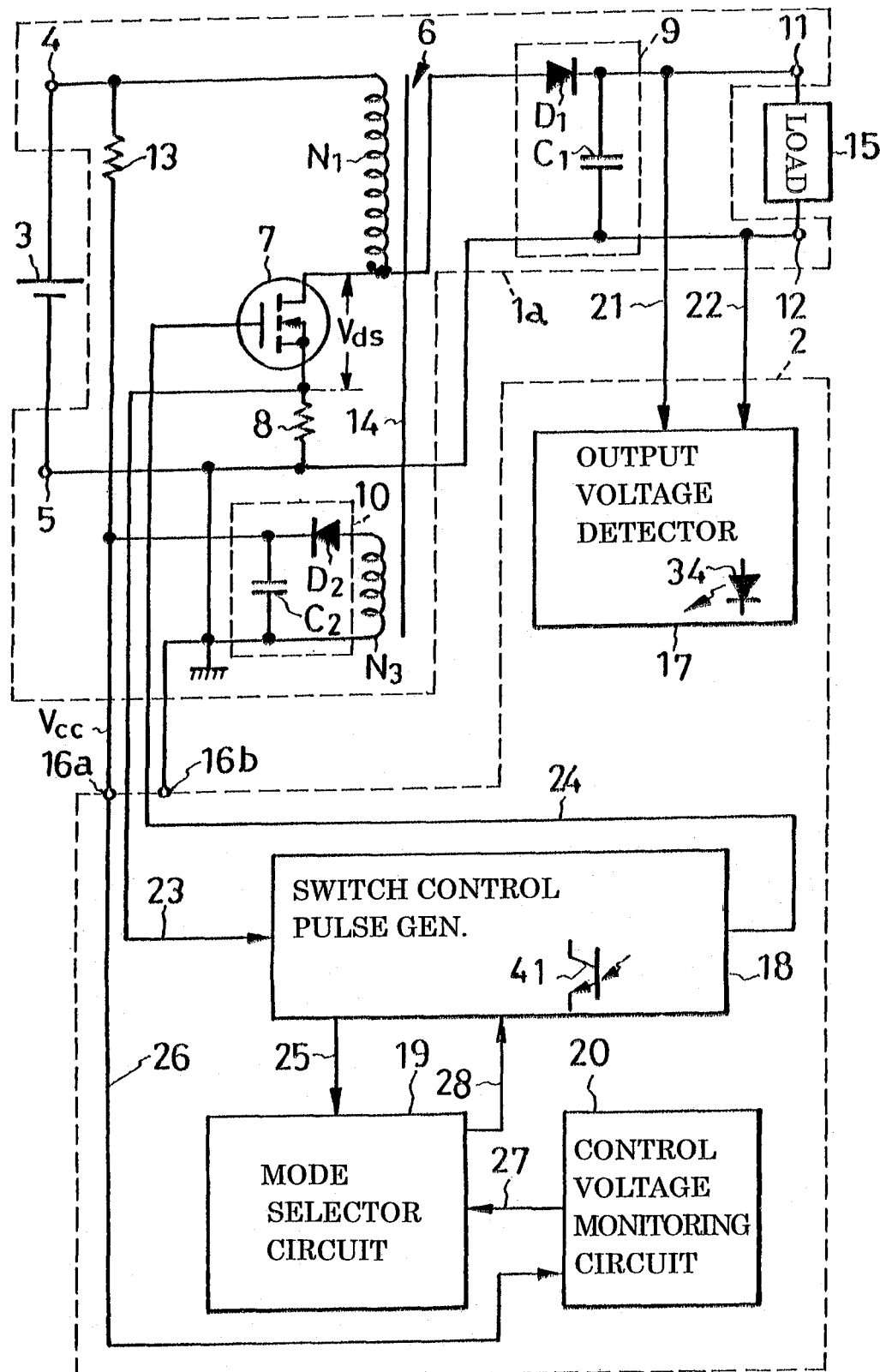
FIG. 6 is a diagram similar to FIG. 1 but showing another preferred embodiment of the invention.

Embodiment of FIG. 6

Here the invention is applied to a different type of DC-to-DC converter featuring a modified DC-to-DC conversion circuit 1 a in which the transformer 6 has no secondary winding. The first rectifying and smoothing circuit 9 is connected in parallel with the active switch 7 instead of with the transformer secondary as in the first described embodiment of the invention. This DC-to-DC converter, including the switch control circuit 2, is akin to that of FIGS. 1 and 2 in all the other details of construction.

In operation, energy will be stored on the inductive transformer primary $N_1$ during each conductive period of the active switch 7 when the rectifying diode $D_1$ of the first rectifying and smoothing circuit 9 is reverse biased. The stored energy will be released from the transformer primary $N_1$ when the rectifying diode $D_1$ is subsequently forward biased upon opening of the active switch 7. Then the smoothing capacitor $C_1$ of the first rectifying and smoothing circuit 9 will be charged with the resultant of the voltage across the power supply 3 and that across the transformer primary $N_1$. Thus the DC-to-DC converter incorporates a boost switching regulator.

The transformer tertiary $N_3$ is connected as in the FIGS. 1 and 2 embodiment to the second rectifying and smoothing circuit 10 which supplies the control voltage $V_{cc}$ to the switch control circuit 2. Having the same construction as that in FIG. 2, the switch control circuit 2 operates to provide the overriding control voltage recovery mode as required during operation in light load mode.

Figure 7:
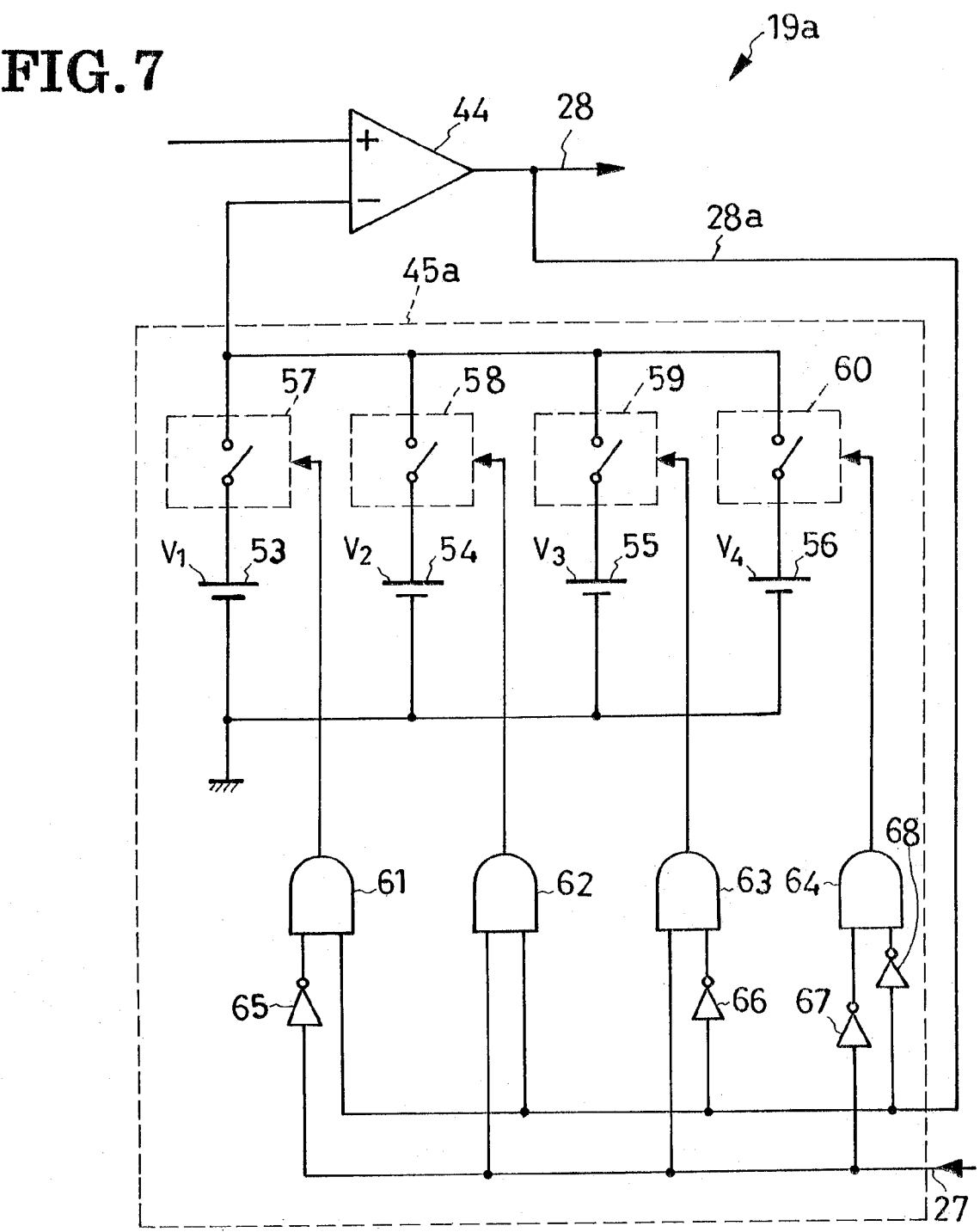
FIG. 7 is a schematic electrical diagram of a modification of the mode select circuit in the DC-to-DC converter of FIG. 1.

Embodiment of FIG. 7

A modified mode selector circuit $19_a$ is shown here for use in the switch control circuit 2, FIG. 2, in substitution for the mode selector circuit 19. The modified mode selector circuit $19_a$ is akin to its FIG. 2 counterpart 19 except that the former has a modified multiple reference voltage generator circuit $45_a$ in place of its FIG. 2 counterpart 45.

The modified multiple reference voltage generator, circuit $45_a$ has four separate sources 53, 54, 55 and 56 of different reference voltages $V_1$, $V_2$, $V_3$ and $V_4$. These reference voltage sources 53–56 are all connected to the minus input of the mode select comparator 44 via respective switches 57, 58, 59 and 60, the plus input of the mode select comparator being connected to the junction $P_1$, FIG. 2, of the feedback circuit 39 as in the foregoing embodiments of the invention.

The switches 57–60 of the modified multiple reference voltage generator circuit $45_a$ are under the control of AND gates 61, 62, 63 and 64, respectively. The first AND gate 61 has one input connected directly to the output conductor $28_a$ of the mode select comparator 44, and another input connected to the output conductor 27 of the control voltage comparator 51, FIG. 2, of the control voltage monitoring circuit 20 via a NOT circuit 65. The second AND gate 62 has one input connected directly to the output conductor $28_a$ of the mode select comparator 44, and another input connected directly to the output conductor 27 of the control voltage comparator 51. The third AND gate 63 has one input connected to the output conductor $28_a$ of the mode select comparator 44 via a NOT circuit 66, and another input connected directly to the output conductor 27 of the control voltage comparator 51. The fourth AND gate 64 has one input connected to the output conductor $28_a$ of the mode select comparator 44 via a NOT circuit 68, and another input connected to the output conductor 27 of the control voltage comparator 51 via a NOT circuit 67.

Constructed as in the foregoing, the modified multiple reference voltage generator circuit $45_a$ is functionally equivalent to its FIG. 2 counterpart 45. A comparison of FIGS. 2 and 7 will reveal that the modified multiple reference voltage generator circuit $45_a$ puts out the reference voltage $V_r$ of the four different values $V_1$–$V_4$ as at (C) in FIG. 5 under the same conditions as does the first disclosed circuit 45.

Figure 8:
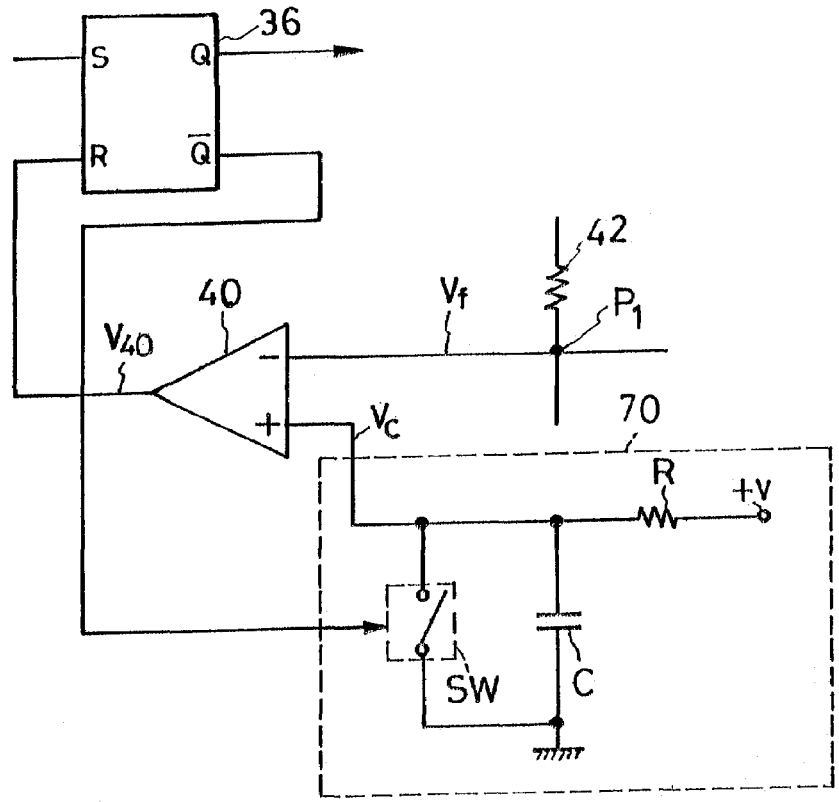
FIG. 8 is a partial schematic electrical diagram of another modification of the switch control circuit in the DC-to-DC converter of FIG. 1.
Figure 9:
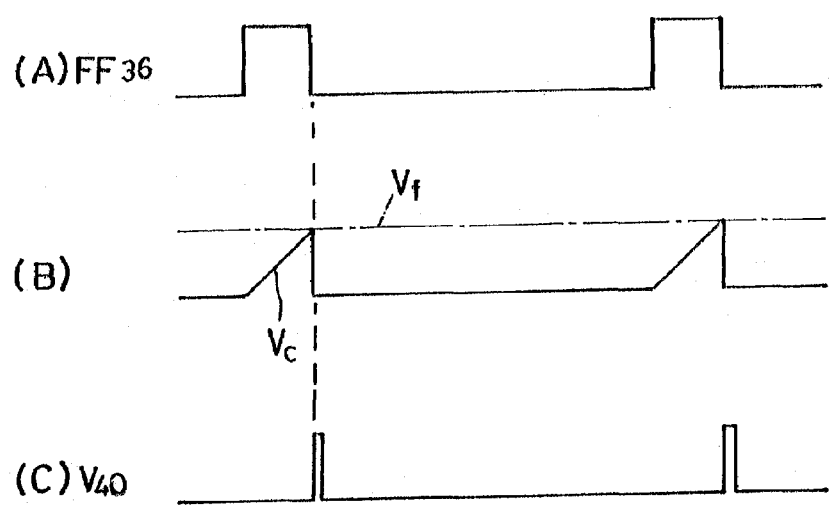
FIG. 9, consisting of (A) through (C), is a diagram of waveforms appearing at various parts of the modified switch control circuit of FIG. 8.

Embodiment of FIGS. 8 and 9

At 70 in FIG. 8 is shown a sawtooth generator circuit which may be adopted in lieu of the current detect resistor 8, FIG. 1. As will be recalled by referring back to both FIGS. 1 and 2, the current detect resistor 8 provides the sawtoothed current detect signal $V_i$, seen at (E) in both FIGS. 3 and 4, for application to the switch control comparator 40 as in FIG. 2. The sawtooth generator circuit 70 comprises a capacitor C having one terminal coupled to a DC supply terminal +V via a resistor R, and another terminal grounded. A switch SW is connected in parallel with the capacitor C and has a control input connected to the inverting output of the RS flip-flop 36.

As the switch SW is turned on and off by the output, FIG. 9 (A), from the flip-flop 36, the capacitor C will be charged from the supply terminal +V in synchronism with the closure of the active switch 7, FIG. 1. Thus the sawtooth generator circuit 70 provides a ramp voltage signal $V_c$, FIG. 9 (B), for application to the plus input of the switch control comparator 40. Each time the ramp voltage $V_c$ reaches the feedback signal $V_f$, the switch control comparator 40 will reset the flip-flop 36 and thereby cause the switch SW to turn on. The capacitor C will then discharge.

POSSIBLE MODIFICATIONS

Notwithstanding the foregoing detailed disclosure it is not desired that the present invention be limited by the exact showing of the drawings or the description thereof. The following is a brief list of possible modifications, alterations or adaptations of the illustrated embodiments which are all believed to fall within the purview of this invention:

1. The invention is adaptable for a variety of DC-to-DC converters each having one or more active switches to be controlled, other than that designated 1 in FIG. 1. Examples include a forward DC-to-DC converter, a half-bridge DC-to-DC converter having a pair of active switches, a modified half-bridge DC-to-DC converter, a combination of a bridge inverter circuit, with four active switches in bridge connection, and a rectifying and smoothing circuit on the output stage of the inverter circuit, and a combination of a push-pull inverter, having two active switches and a transformer, and a rectifying and smoothing circuit.
2. The active switch 7 could be driven at a rate that varies with the power requirement of the load.
3. The mode select comparator 44, FIG. 2, of the mode selector circuit 19 is replaceable by a hysteretic comparator for combined use with a single reference voltage source instead of the multiple reference voltage generator circuit 45 Another circuit will then be required for altering the range of hysteretic operation of the comparator according to the output $V_{51}$, FIG. 5 (F), from the control voltage comparator 51.
4. The active switch 7 could take the form of controllable solid-state switches other than the FET, such as a bipolar transistor and an insulated-gate bipolar transistor.
5. The output voltage detector circuit 17, FIG. 1, and switch control pulse generator circuit 18 may be coupled together electrically instead of via the optocouplers in cases where such an isolation mechanism is not required.
6. Logic circuits such as the AND gate 37, FIG. 2, are replaceable by other equivalent means.
7. The current detect resistor 8 is replaceable by other means such as a Hall generator or like magneto-electric converter.
8. The mode selector circuit 19 is modifiable to rely on the current detect signal $V_i$, rather than on the feedback signal $V_f$, to determine the power requirement of the load.
9. As indicated by the dashed lines in FIG. 2, the AND gate 37 could be connected between flip-flop 36 and switch driver circuit 38, with the two inputs of the AND gate connected respectively to the flip-flop 36 and to the mode select comparator 44. The clock pulses might then be fed directly into the flip-flop 36.

What is claimed:
1. A dual-mode switching DC-to-DC converter capable of operation in either normal load mode or light load mode depending upon the power requirement of a load, the DC-to-DC converter having an active switch connected to DC input means via a transformer, a switch control circuit for controllably driving the active switch, a first rectifying and smoothing circuit connected between the transformer and DC output means for providing a DC output voltage to be applied to a load, and a second rectifying and smoothing circuit connected between the transformer and the switch control circuit for providing a control voltage to be fed to the switch control circuit for powering the same, wherein the improvement resides in the switch control circuit comprising:
- (a) feedback circuit means for providing a feedback signal indicative of the DC output voltage;
- (b) a control voltage monitoring circuit connected to the second rectifying and smoothing circuit for providing an output signal indicative of whether the control voltage is less than a predefined limit or not;
- (c) a switch control pulse generator circuit connected between the feedback circuit means and the active switch for generating switch control pulses thereby to drive the active switch so as to keep the DC output voltage constant;
- (d) a multiple reference voltage generator circuit connected to the control voltage monitoring circuit for providing a multiple-value reference signal that has either of first two different predefined values when the control voltage is not less than the predefined limit and that has either of second two different predefined values when the control voltage is less than the predefined limit, the second two different predefined values being intermediate the first two different predefined values; and
- (e) a mode select comparator having a first input connected to the feedback circuit means, a second input connected to the multiple reference voltage generator circuit, and an output connected to the switch control pulse generator circuit.

2. A dual-mode switching DC-to-DC converter as defined in claim 1, wherein the multiple reference voltage generator circuit comprises:
- (a) means for generating a first reference voltage value when the control voltage is not less than the predefined limit;
- (b) means for generating a second reference voltage value, which is higher than the first reference voltage value, when the control voltage is less than the predefined limit;
- (c) means for generating a third reference voltage value, which is higher than the second reference voltage value, when the control voltage is less than the predefined limit; and
- (d) means for generating a fourth reference voltage value, which is higher than the third reference voltage value, when the control voltage is not less than the predefined limit.

3. A dual-mode switching DC-to-DC converter as defined in claim 1, wherein the multiple reference voltage generator circuit comprises:
- (a) a serial circuit of a first switch and a first resistor and a first reference voltage source connected to the second input of the mode select comparator, the first switch being closed when the active switch is being driven;
- (b) a serial circuit of a second switch and a second resistor and a second reference voltage source connected to the second input of the mode select comparator, the second switch being closed when the active switch is not being driven;
- (c) a serial circuit of a third switch and a third resistor connected in parallel with the serial circuit of the first resistor and the first reference voltage source, the third switch being closed when the control voltage is not less than the predefined limit; and
- (d) a serial circuit of a fourth switch and a fourth resistor connected in parallel with the serial circuit of the second resistor and the second reference voltage source, the fourth switch being closed when the control voltage is less than the predefined limit.

4. A dual-mode switching DC-to-DC converter as defined in claim 1, wherein the predefined limit of the control voltage from the second rectifying and smoothing circuit is less than a rated output voltage of the second rectifying and smoothing circuit and not less than a minimum voltage at which the switch control circuit is maintained in operation.

5. A dual-mode switching DC-to-DC converter as defined in claim 1, wherein the switch control pulse generator circuit of the switch control circuit comprises:
- (a) ramp generating means for generating a ramp signal in synchronism with the conducting periods of the active switch;
- (b) a switch control comparator connected to the feedback means and the ramp generating means for comparing the feedback signal and the ramp signal;
- (c) a source of clock pulses;
- (d) a logic circuit having one input connected to the clock pulse source and another input connected to the mode select comparator for selectively blocking the clock pulses as required by the mode select comparator;
- (e) an RS flip-flop having one input connected to the logic circuit and another input connected to the switch control comparator; and
- (f) a switch driver connected between the flip-flop and the active switch for driving the latter in response to an output from the former.

6. A dual-mode switching DC-to-DC converter as defined in claim 1, wherein the switch control pulse generator circuit of the switch control circuit comprises:
- (a) ramp generating means for generating a ramp signal in synchronism with the conducting periods of the active switch;
- (b) a switch control comparator connected to the feedback means and the ramp generating means for comparing the feedback signal and the ramp signal;
- (c) a source of clock pulses;
- (d) an RS flip-flop having one input connected to the clock pulse source and another input connected to the switch control comparator;
- (e) a logic circuit having one input connected to the flip-flop and another input connected to the mode select comparator for selectively blocking the clock pulses as required by the mode select comparator; and
- (f) a switch driver connected between the flip-flop and the active switch for driving the latter in response to an output from the former.

* * * * *